(12) United States Patent
Johnston (10) Patent No.: US 8,839,745 B1
(45) Date of Patent: Sep. 23, 2014

(54) LEASH CADDY SYSTEM

(71) Applicant: Kenny A. Johnston, Riverside, CA (US)

(72) Inventor: Kenny A. Johnston, Riverside, CA (US)

( * ) Notice: Subject to any disclaimer, the term of this patent is extended or adjusted under 35 U.S.C. 154(b) by 19 days.

(21) Appl. No.: 13/771,110

(22) Filed: Feb. 20, 2013

Related U.S. Application Data

(60) Provisional application No. 61/603,677, filed on Feb. 27, 2012.

(51) Int. Cl.
*A01K 27/00* (2006.01)

(52) U.S. Cl.
CPC .............. *A01K 27/004* (2013.01); *A01K 27/003* (2013.01)
USPC ............................. 119/795; 119/796; 119/769

(58) Field of Classification Search
USPC ........................... 119/792, 795, 796, 161, 769
IPC .............................................. A01K 27/00,29/00
See application file for complete search history.

(56) References Cited

U.S. PATENT DOCUMENTS

| | | | | |
|---|---|---|---|---|
| 4,047,650 A | * | 9/1977 | Domingos | 224/223 |
| D364,038 S | * | 11/1995 | Stanchin | D3/230 |
| 5,833,093 A | * | 11/1998 | Honaker et al. | 222/175 |
| 5,964,386 A | * | 10/1999 | Cote | 224/250 |
| 6,065,659 A | * | 5/2000 | Faz | 224/661 |
| 6,244,485 B1 | * | 6/2001 | Holland et al. | 224/584 |
| 6,244,486 B1 | * | 6/2001 | Holland et al. | 224/584 |
| 6,257,473 B1 | * | 7/2001 | Ringelstetter | 224/675 |
| 7,367,286 B2 | * | 5/2008 | Beaupre | 119/795 |
| 2008/0149679 A1 | * | 6/2008 | Case et al. | 224/666 |

* cited by examiner

*Primary Examiner* — Son T Nguyen
*Assistant Examiner* — Kathleen Alker
(74) *Attorney, Agent, or Firm* — Emery L. Tracy; Ruth Eure (57) ABSTRACT

A leash caddy system for use with a retractable leash is provided. The retractable leash has a handle. The system comprises a cover with an attachment mechanism secured to the cover for releasably securing the cover around the retractable leash through the handle of the retractable leash. A plurality of guide hoops is mounted to the cover. A first securement mechanism associated with a first guide hoop and a fourth guide hoop secures the cover about the retractable leash. A second securement mechanism associated with the second guide hoop and the fourth guide hoop secures the cover about the retractable leash. Upon securing the cover about the retractable leash, the cover forms a pocket for receiving the cover therein.

18 Claims, 6 Drawing Sheets

LEASH CADDY SYSTEM

The present application claims the benefit of priority of provisional patent application Ser. No. 61/603,677, filed on Feb. 27, 2012, entitled "Hands Free Leash Caddy".

BACKGROUND OF THE INVENTION

1. Field of the Invention

This invention relates generally to a leash caddy system and, more particularly, the invention relates to a leash caddy system for use in securing a retractable leash within a cover and securing the cover and leash to the person thus affording a hands free means of controlling one's pet.

2. Description of the Prior Art

A favorite pastime enjoyed by many dog users, as well as their pets, is taking a leisurely or fast paced walk. Breathing in the fresh air, stretching the body with some light exercise, and enjoying the sites and sounds of new surroundings, taking an outdoor walk can be a revitalizing experience for both the animal and their user. Typically, most dogs love going for walks. Not surprisingly, many dog users report that their pets instinctively run for the door as soon as they see that their master's have grabbed their leash.

When walking their animal, many pet users often multi-task, talking on their cellular telephone or even enjoying a steamy cup of hot coffee, all while they stroll with their pet. Unfortunately, trying to control a spirited, leashed animal with one hand, while holding a piping cup of coffee, a newspaper or cell phone with the other, can be difficult. Often resulting in the leash becoming tangled, or the user dropping the item they are holding onto, multitasking while walking a dog can sometimes be a daunting venture.

Another problem encountered by pet users when walking their animal has to do with storing items necessary on the go. When taking a dog for a walk, most consumers carry one or more plastic bags for disposing dog waste. Bulging from coat and pant pockets, transporting the bags necessary for walking with one's dog can detract from the overall fun of this activity.

SUMMARY

The present invention is a leash caddy system for use with a retractable leash. The retractable leash has a handle. The leash caddy system comprises a cover having an inner surface, an outer surface substantially opposite the inner surface, a first end, a second end substantially opposite the first end, a first side between the first end and the second end, and a second side substantially opposite the first side of the cover. An attachment mechanism secured to the cover releasably secures the cover around the retractable leash through the handle of the retractable leash. A first guide hoop is mounted to the inner surface of the cover along the first side of the cover and adjacent the first end of the cover. A second guide hoop is mounted to the inner surface of the cover along the second side of the cover adjacent the first end of the cover. A third guide hoop is mounted to the inner surface of the cover between the first guide hoop and the second end of the cover with the third guide hoop aligned with the first guide hoop. A fourth guide hoop is mounted to the inner surface of the cover between the second guide hoop and the second end of the cover with the fourth guide hoop aligned with the second guide hoop. A first securement mechanism associated with the first guide hoop and the third guide hoop secures the cover about the retractable leash. A second securement mechanism associated with the second guide hoop and the fourth guide hoop secures the cover about the retractable leash. Upon securing the cover about the retractable leash, the cover forms a pocket for receiving the over therein.

In addition, the present invention is a leash caddy system for use with a retractable leash. The retractable leash has a handle. The leash caddy system comprises a cover having an inner surface, an outer surface substantially opposite the inner surface, a first end, a second end substantially opposite the first end, a first side between the first end and the second end, and a second side substantially opposite the first side of the cover. An attachment mechanism is secured to the cover for releasably securing the cover around the retractable leash with the attachment mechanism mounted at the first end of the outer surface of the cover and the second end of the inner surface of the cover. The second end of the cover is positioned through the handle of the retractable leash. A first guide hoop is mounted to the inner surface of the cover along the first side of the cover and adjacent the first end of the cover. A second guide hoop is mounted to the inner surface of the cover along the second side of the cover adjacent the first end of the cover. A third guide hoop is mounted to the inner surface of the cover between the first guide hoop and the second end of the cover with the third guide hoop aligned with the first guide hoop. A fourth guide hoop is mounted to the inner surface of the cover between the second guide hoop and the second end of the cover with the fourth guide hoop aligned with the second guide hoop. A first strip is securable between the first guide hoop and the third guide hoop and a second strip is securable between the second guide hoop and the fourth guide hoop. A clip is mounted to the outer surface of the cover. Upon securing the cover about the retractable leash, the cover forms a pocket for receiving the cover therein.

The present invention further includes a method for using a retractable leash with the retractable leash having a handle. The method comprises providing a cover having an inner surface, an outer surface substantially opposite the inner surface, a first end, a second end substantially opposite the first end, a first side between the first end and the second end, and a second side substantially opposite the first side of the cover, releasably securing the cover around the retractable leash, positioning the second end of the cover through the handle of the retractable leash, forming a pocket for receiving the cover therein, mounting a first guide hoop to the inner surface of the cover along the first side of the cover and adjacent the first end of the cover, mounting a second guide hoop to the inner surface of the cover along the second side of the cover adjacent the first end of the cover, mounting a third guide hoop to the inner surface of the cover between the first guide hoop and the second end of the cover, aligning the third guide hoop with the first guide hoop, mounting a fourth guide hoop to the inner surface of the cover between the second guide hoop and the second end of the cover, aligning the fourth guide hoop with the second guide hoop, securing a first strip between the first guide hoop and the third guide hoop, securing a second strip between the second guide hoop and the fourth guide hoop, and mounting a clip to the outer surface of the cover.

DETAILED DESCRIPTION PREFERRED EMBODIMENTS

Figure 1:
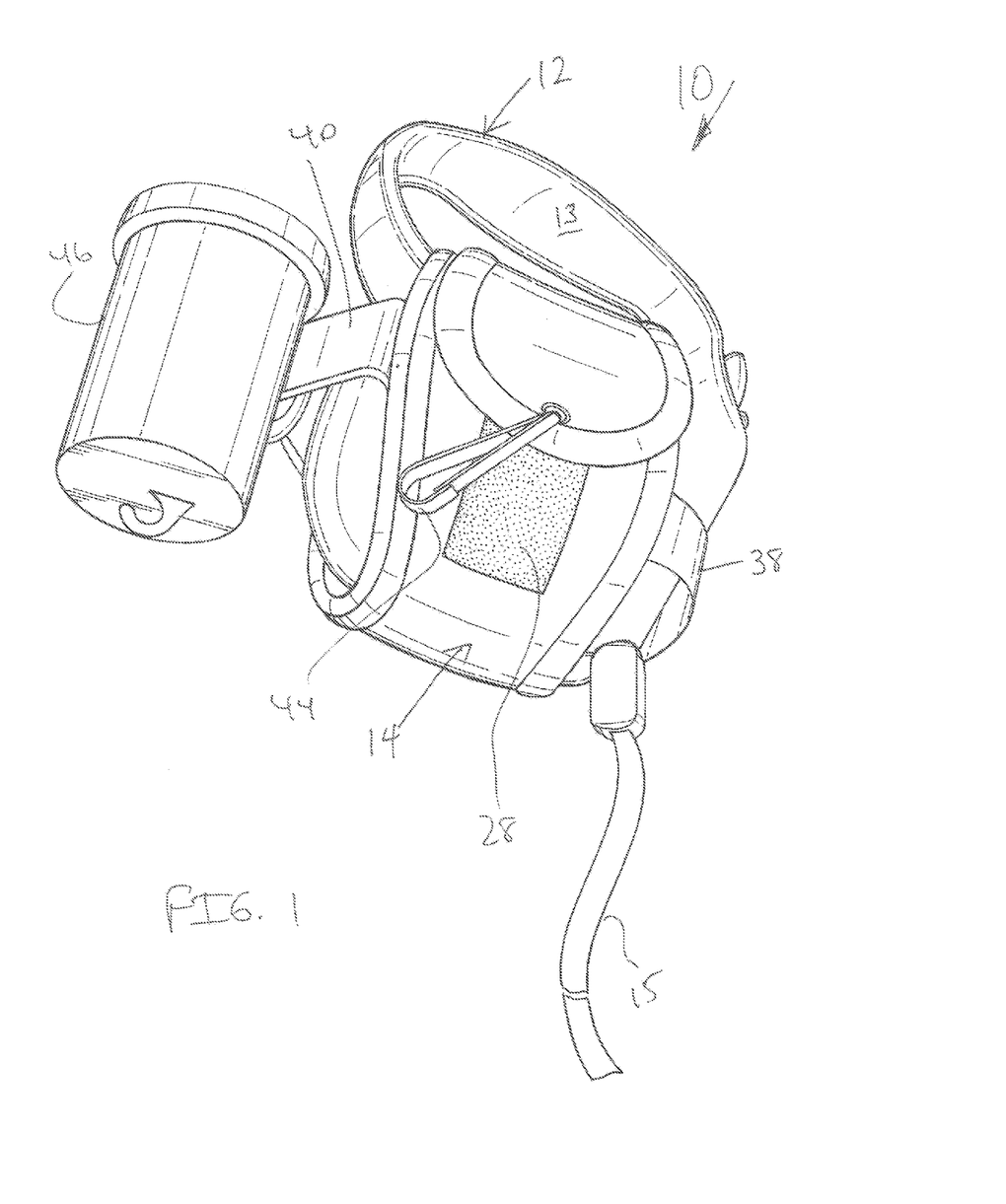
FIG. 1 is a front perspective view illustrating a leash caddy system, constructed in accordance with the present invention, with a cover wrapped around a retractable leash.
Figure 2:
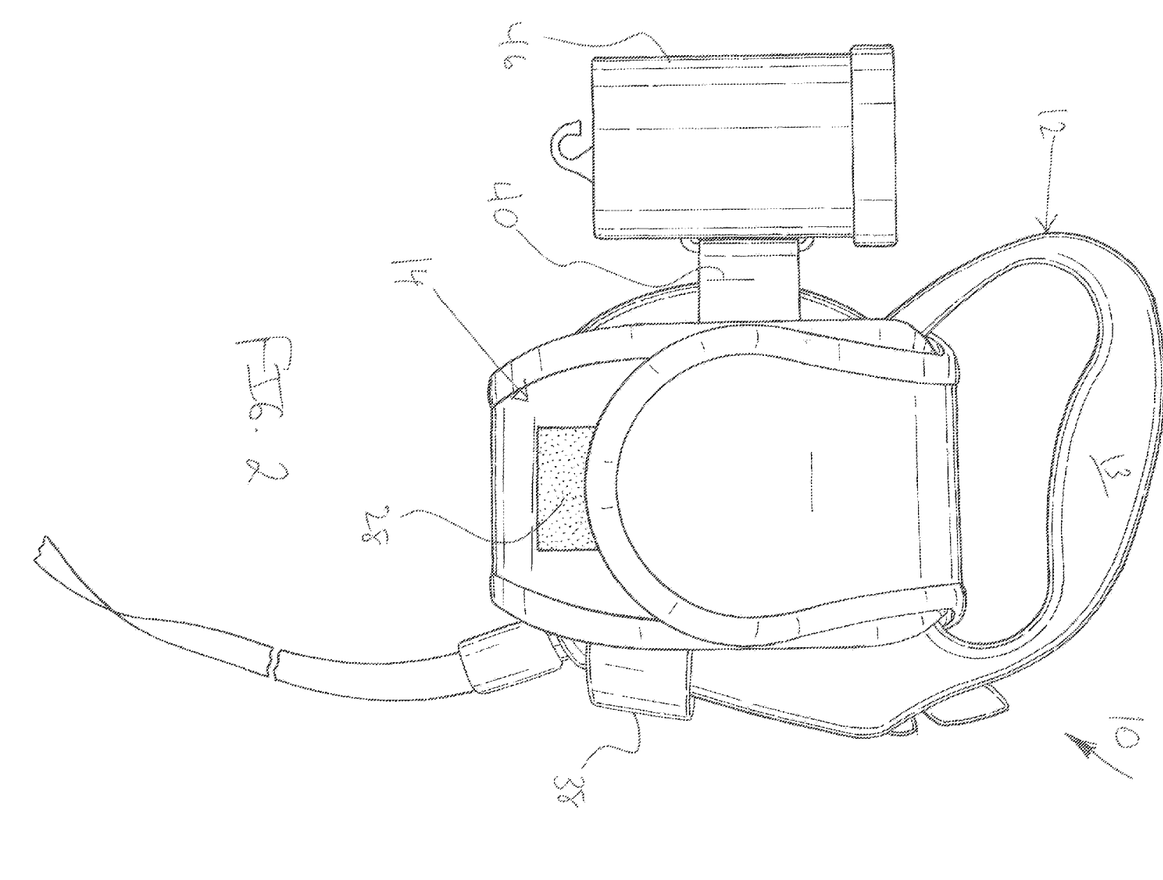
FIG. 2 is a front elevational view illustrating the leash caddy system, constructed in accordance with the present invention, with the cover wrapped around the retractable leash.
Figure 3:
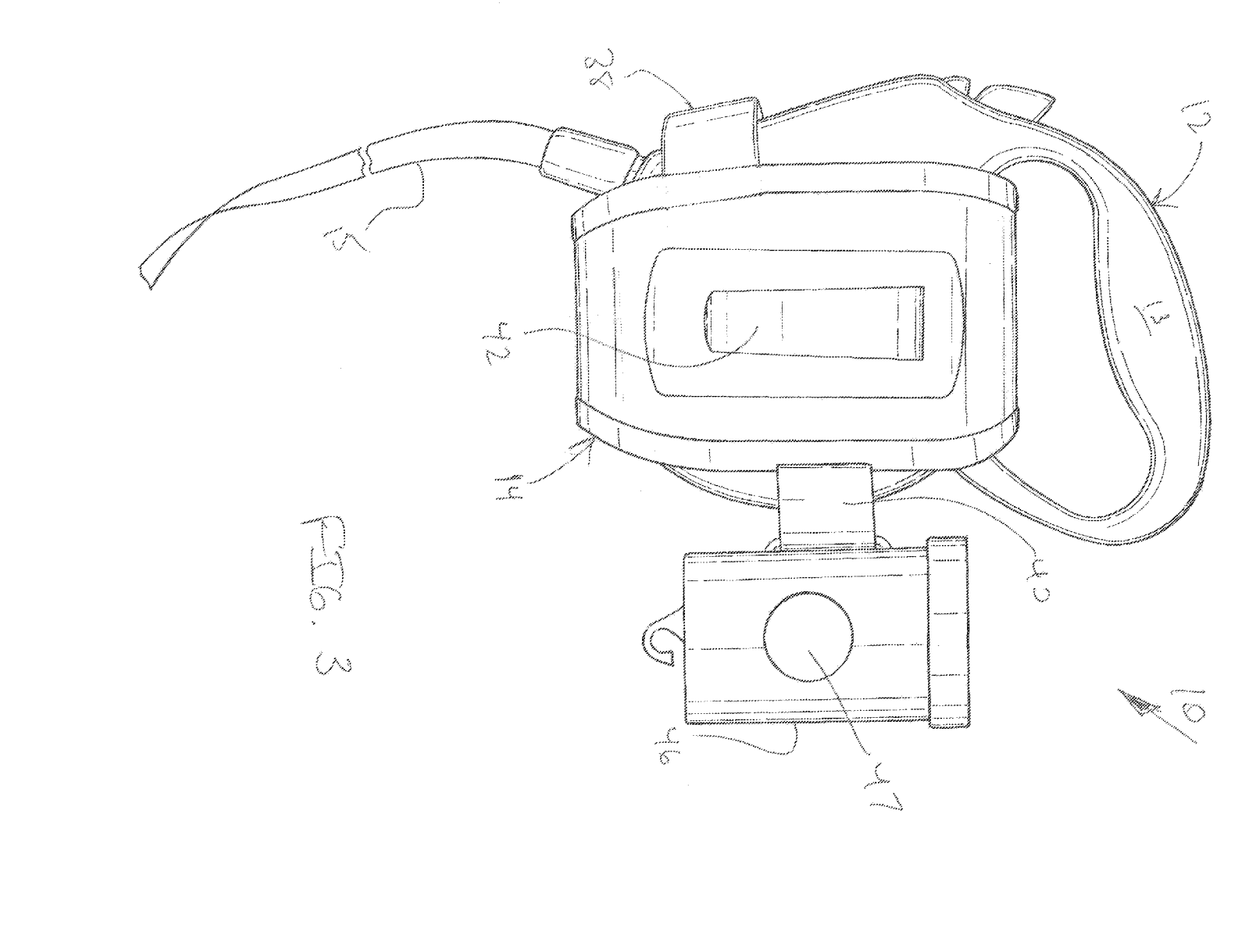
FIG. 3 is a rear elevational view illustrating the leash caddy system, constructed in accordance with the present invention, with the cover wrapped around the retractable leash.
Figure 4:
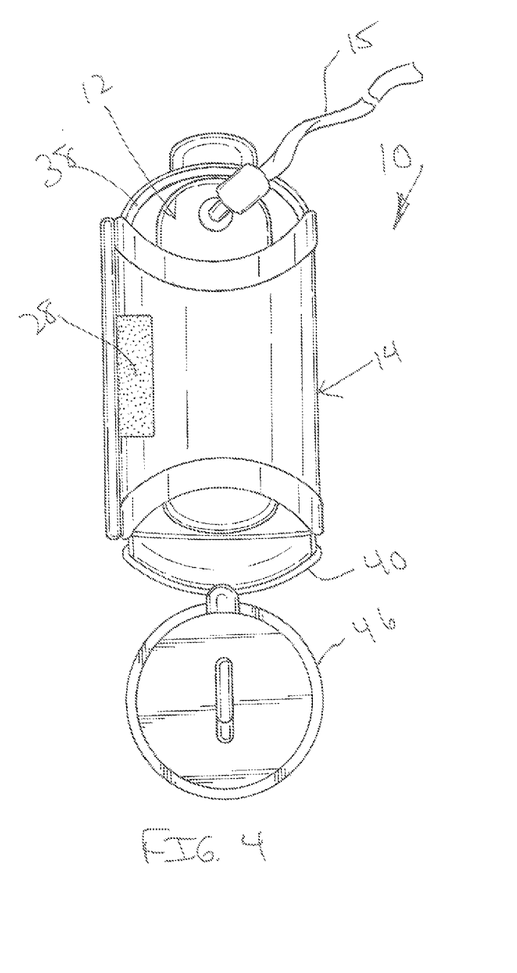
FIG. 4 is a bottom plan view illustrating the leash caddy system, constructed in accordance with the present invention, with the cover wrapped around the retractable leash.
Figure 5:
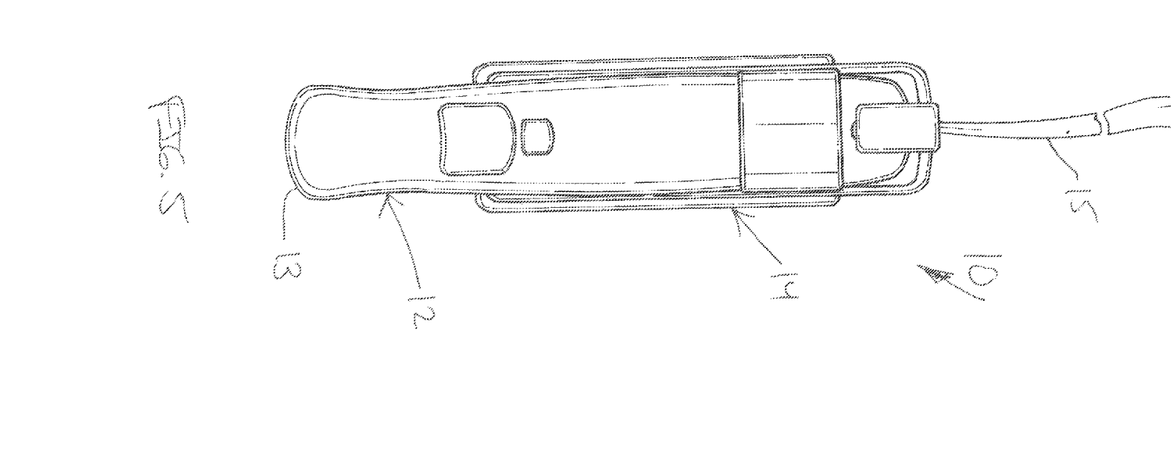
FIG. 5 is a side elevational view illustrating the leash caddy system, constructed in accordance with the present invention, with the cover wrapped around the retractable leash.
Figures 6, 7:
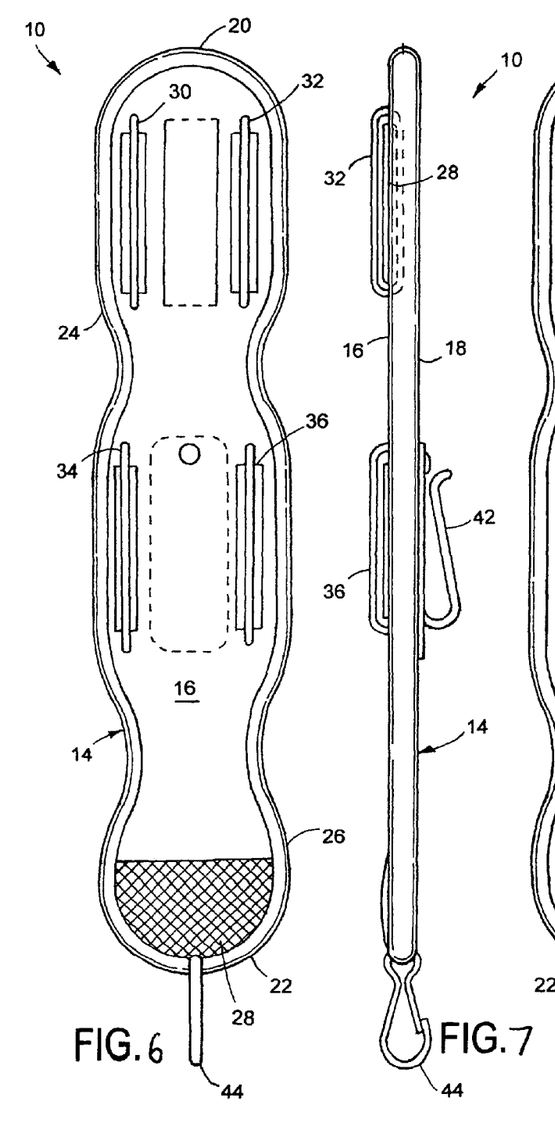
FIG. 6 is a top plan view illustrating the leash caddy system, constructed in accordance with the present invention, without the retractable leash.
FIG. 7 is a side elevational view illustrating the leash caddy system, constructed in accordance with the present invention, without the retractable leash.
Figure 8:
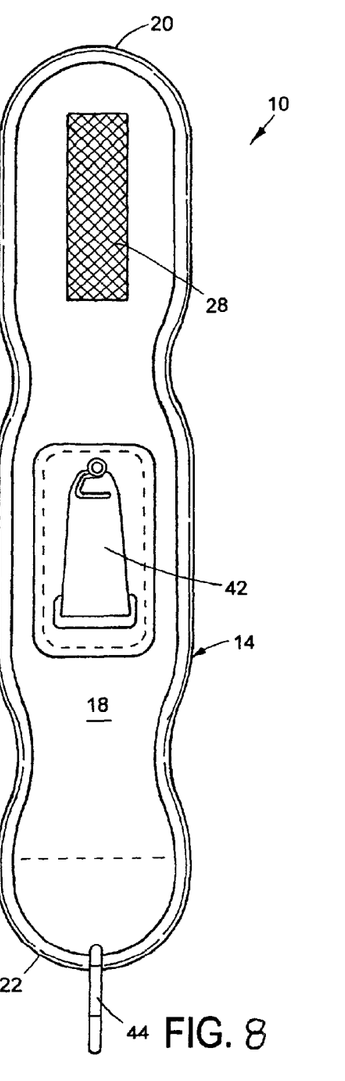
FIG. 8 is a bottom plan view illustrating the leash caddy system, constructed in accordance with the present invention, without the retractable leash.
Figure 9:
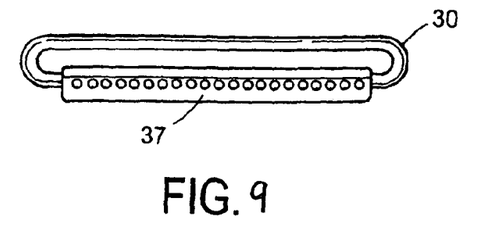
FIG. 9 is a side elevational view illustrating a guide hoop of the leash caddy system, constructed in accordance with the present invention.
Figure 10:
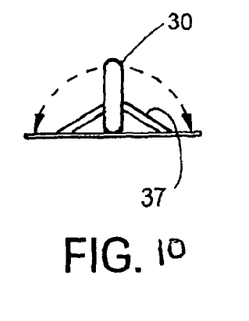
FIG. 10 is an end view illustrating the guide hoop of the leash caddy system of FIG. 9, constructed in accordance with the present invention.

As illustrated in FIGS. 1-10, the present invention is a leash caddy system, indicated generally at 10, for use in securing a retractable leash 12 within a cover 14 and releasably securing the combined cover 14 and retractable leash 12 to the person thus affording a hands free means of controlling one's pet. The leash caddy system 10 of the present invention is especially useful for those users with a retractable leash 12 who desire a hands free moment or time while using the retractable leash 12.

As stated above, the leash caddy system 10 of the present invention is a pliable cover 14 foldable about the retractable leash 12, though the handle 13 of the retractable leash 12, to form a pocket around the retractable leash 12. The cover 14 has an inner surface 16, an outer surface 18 substantially opposite the inner surface 16, a first end 20, a second end 22 substantially opposite the first end 20, a first side 24 between the first end 20 and the second end 22, and a second side 26 between the first end 20 and the second end 22, substantially opposite the first side 20. Mounted at the first end 20 of the outer surface 18 and the second end 22 of the inner surface 16 is an attachment mechanism 28 for releasably securing the cover 14 about the retractable leash 12. In a preferred embodiment, the attachment mechanism 28 is a hook and loop fastening mechanism although having another type of attachment mechanism 28 including, but not limited to, snaps, buttons, hooks, magnets etc., is within the scope of the present invention.

In addition, the leash caddy system 10 of the present invention includes a first guide hoop 30 mounted to the inner surface 16 of the cover 14 adjacent the first end 20 of the cover 14, a second guide hoop 32 mounted to the inner surface 16 of the cover 14 adjacent the first end 20 of the cover 14, a third guide hoop 34 mounted to the inner surface 16 of the cover 14 substantially equal distance between the first end 20 and the second end 22 of the cover 14 and substantially aligned with the first guide hoop 30, and a fourth guide hoop 36 mounted to the inner surface 16 of the cover 14 substantially equal distance between the first end 20 and the second end 22 of the cover 14 and substantially aligned with the second guide hoop 32. Each of the guide hoops 30, 32, 34, 36 are preferably constructed from a metal material or a plastic material and serve to allow the securement mechanisms 28 to slide and adjust completely along the length of the guide hoops 30, 32, 34, 36 to accommodate different size and shape retractable leashes 12, as will be described in further detail below.

The leash caddy system 10 of the present invention further includes a first securement mechanism 38 and a second securement mechanism 40 to further secure the retractable leash 12 within the cover 14. In a preferred embodiment the first securement mechanism 38 includes a first strip of material secured to the third guide hoop 34 and having a hook and loop fastening mechanism and the second securement mechanism 40 is a second strip of material secured to the fourth guide hoop 36 and having a hook and loop fastening mechanism. In operation, as the cover 14 is folded about the retractable leash 12 and secured by the attachment mechanism 28, as described above, the first strip 38 of material is guided through the first guide hoop 30 and secured upon itself and the second strip 40 of material is guided through the second guide hoop 32 and secured upon itself. The first strip 38 and the second strip 40 further secure the retractable leash 12 within the cover 14 and allow the user to attach additional items, as will be described in further detail below.

As understood by those persons skilled in the art, the first strip 38 and the second strip 40 of the leash caddy system 10 of the present invention are able to slide along the entire lengths of their respective guide hoops allowing the leash caddy system 10 to accommodate different shape and size retractable leashes 12 as well as retractable leashes 12 having the leash 15 exit the retractable leash 12 at a top position, a middle position, and a bottom position. In addition, preferably, each of the guide hoops 30, 32, 34, 36 are mounted to the inner surface 16 of the cover 14 via a hoop sleeve 37 with the guide hoops 30, 32, 34, 36 slidable within their respective hoop sleeves 37 further allowing the cover 14 to accommodate different shape and size retractable leashes 12. Furthermore, the guide hoops 30, 32, 34, 36 are able to rotate approximately 180 degrees toward and away from the inner surface 16 of the cover 14.

Additionally, the leash caddy system 10 of the present invention includes a clip 42 mounted to the outer surface 18 or the cover 14 approximately equal distance between the first end 20 and the second end 22 of the cover 14. The clip 42 is sized and shaped for receiving a belt, pant's waistband, or the like allowing the user to control their animal, hands free.

Furthermore, the leash caddy system 10 of the present invention can include additional features for safety and convenience of the user. First, the leash caddy system 10 can include a key ring clip 44 secured to the second end 22 of the cover 14 for holding a user's keys or the like. Second, the leash caddy system 10 can include a waste bag holder 46 releasably mounted to either the first strip 38 or the second strip 40 for holding a plurality of waste bags. The waste bag holder 46 can have an aperture 47 formed in one or two sides allowing easy retrieval of the waste bags therein. Finally, the leash caddy system 10 can include a flashlight releasably securable to either the first strip 38 or the second strip 40 removable for additional light in low light conditions.

The manner of use of the leash caddy system 10 of the present invention will now be described. It will be understood by those skilled in the art that the manner of use of the leash caddy system 10 described herein is merely one method of use and other methods of use of the leash caddy system 10 are within the scope of the present invention.

Use of the leash caddy system 10 of the present invention is very simple and straightforward. First, the user secures positions the retractable leash 12 within the cover 14 of the leash caddy system 10 and hooks the leash to the pet's collar or harness. The leash handle 13 is positioned outside the cover 14 of the leash caddy system 10 allowing the user to easily grasp the handle 13 and control their pet. The user and animal then sets out for their walk. While strolling, the user might choose to secure the leash caddy system 10 to their belt or waistband, utilizing the leash caddy system 10 to enjoy hands free control over their pet. In this manner, the user enjoys the hands-free convenience of the leash caddy system 10, while the dog freely roams about either side, in front or behind their user, securely tethered to the user by the clip 42. Returning safely home, the user easily removes the retractable leash 12 by unhooking the retractable leash 12 from the dog's collar, storing the combined retractable leash 12 and leash caddy system 10 away until again needed.

The hands free leash caddy system 10 of the present invention affords users, and their animals, several benefits and advantages. Foremost, the leash caddy system 10 offers dog lovers a simple, hands-free means of walking their pet. Users will appreciate that simply by securing the cover 14 of the leash caddy system 10 about their waist they can enjoy a leisurely stroll with their pet, while keeping their hands free to multitask. Whether chatting on the phone with a friend or enjoying an icy cold beverage, use of the leash caddy system 10 allows the net user to perform these activities, all while safely walking their animal. Eliminating the need to continuously pass a leash 12 back and forth between the hands, simply in order to alleviate the strain associated with holding the leash or to satisfy the directional demands of the animal, the leash caddy system 10 enables the dog user to walk their pet in comfort and with ease. Further, pets secured to the leash caddy system 10 enjoy the freedom that the unique leash caddy system 10 allows. Enabling the animal free range to roam on either side, behind or in front of the user, the leash caddy system 10 proves a favorite commodity of both the user and the pet. Versatile, the leash caddy system 10 is ideal for use with virtually any size dog.

Versatile and unique, the hands free leash caddy system 10 offers users a comfortable, hands-free means of walking their pet. Lightweight and easily donned, the leash caddy system 10 proves a favorite commodity of any pet lover. Featuring an integrated bag dispenser 46 and ample storage for these bags once they are filled, the leash caddy system 10 also enables pet users to easily transport goods needed when walking one's pet. The leash caddy system 10 can he left on the retractable leash 12 and put to the waistline when an extra and is needed.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A leash caddy system for use with a retractable leash, the retractable leash having a handle, the leash caddy system comprising:
    a cover having an inner surface, an outer surface substantially opposite the inner surface, a first end, a second end substantially opposite the first end, a first side between the first end and the second end, and a second side substantially opposite the first side of the cover;
    an attachment mechanism secured to the cover for releasably securing the cover around the retractable, leash through the handle of the retractable leash;
    a first guide hoop mounted to the inner surface of the cover along the first side of the cover and adjacent the first end of the cover;
    a second guide hoop mounted to the inner surface of the cover along the second side of the cover adjacent the first end of the cover;
    a third guide hoop mounted to the inner surface of the cover between the first guide hoop and the second end of the cover, the third guide hoop aligned with the first guide hoop;
    a fourth guide hoop mounted to the inner surface of the cover between the second guide hoop and the second end of the cover, the fourth guide hoop aligned with the second guide hoop;
    a first securement mechanism associated with the first guide hoop and the third guide hoop for securing the cover about the retractable leash; and
    a second securement mechanism associated with the second guide hoop and the fourth guide hoop for securing the cover about the retractable leash;
    wherein upon securing the cover about the retractable leash, the cover forms a pocket for receiving the cover therein.

2. The leash caddy system of claim 1 wherein the cover is constructed of a pliable material.

3. The leash caddy system of claim 1 wherein the attachment mechanism is mounted at the first end of the outer surface and the second end of the inner surface.

4. The leash caddy system of claim 3 wherein the attachment mechanism is a hook and loop fastening mechanism.

5. The leash caddy system of claim 1 wherein each of the guide hoops are constructed from a material selected from metal and plastic.

6. The leash caddy system of claim 1 wherein the first securement mechanism is slidable along an entire length of both the first guide hoop and the third guide hoop and the second securement mechanism is slidable along an entire length of both the second guide hoop and the fourth guide hoop.

7. The leash caddy system of claim 1 wherein the first securement mechanism is a first strip of material secured between the first guide hoop and the third guide hoop and the second securement mechanism is a second strip of material secured between the second guide hoop and the fourth guide hoop.

8. The leash caddy system of claim 1 and further comprising:
    a clip mounted to the outer surface of the cover.

9. The leash caddy system of claim 8 wherein the clip is mounted at an equal distance between the first end and the second end of the cover.

10. The leash caddy system of claim 1 and further comprising:
    a key ring clip secured to the second end of the cover.

11. The leash caddy system of claim 1 and further comprising:
    a waste bag holder releasably mounted to either the first securement mechanism or the second securement mechanism, wherein the waste bag holder is capable of holding a plurality of waste bags.

12. The leash caddy system of claim 1 wherein the third guide hoop and the fourth guide hoop are mounted at a substantially equal distance between the first end and the second end of the cover.

13. A leash caddy system for use with a retractable leash, the retractable leash having a handle, the leash caddy system comprising:
- a cover having an inner surface, an outer surface substantially opposite the inner surface, a first end, a second end substantially opposite the first end, a first side between the first end and the second end, and a second side substantially opposite the first side of the cover;
- an attachment mechanism secured to the cover for releasably securing the cover around the retractable leash, the attachment mechanism mounted at the first end of the outer surface of the cover and the second end of the inner surface of the cover, the second end of the cover positioned through the handle of the retractable leash;
- a first guide hoop mounted to the inner surface of the cover along the first side of the cover and adjacent the first end of the cover;
- a second guide hoop mounted to the inner surface of the cover along the second side of the cover adjacent the first end of the cover;
- a third guide hoop mounted to the inner surface of the cover between the first guide hoop and the second end of the cover, the third guide hoop aligned with the first guide hoop;
- a fourth guide hoop mounted to the inner surface of the cover between the second guide hoop and the second end of the cover, the fourth guide hoop aligned with the second guide hoop;
- a first strip securable between the first guide hoop and the third guide hoop;
- a second strip securable between the second guide hoop and the fourth guide hoop; and
- a clip mounted to the outer surface of the cover;
- wherein upon securing the cover about the retractable leash, the cover forms a pocket for receiving the cover therein.

14. The leash caddy system of claim 13 wherein the attachment mechanism is a hook and loop fastening mechanism.

15. The leash caddy system of claim 13 wherein the first strip is slidable along an entire length of both the first guide hoop and the third guide hoop and the second strip is slidable along an entire length of both the second guide hoop and the fourth guide hoop.

16. The leash caddy system of claim 13 and further comprising:
- a key ring clip secured to the second end of the cover.

17. The leash caddy system of claim 13 and further comprising:
- a waste bag holder releasably mounted to either the first strip or the second strip, wherein the waste bag holder is capable of holding a plurality of waste bags.

18. A method for using a retractable leash, the retractable leash having a handle, the method comprising:
- providing a cover having an inner surface, an outer surface substantially opposite the inner surface, a first end, a second end substantially opposite the first end, a first side between the first end and the second end, and a second side substantially opposite the first side
- releasably securing the cover around the retractable leash:
- positioning the second end of the cover through the handle of the retractable leash;
- forming a pocket for receiving the cover therein;
- mounting a first guide hoop to the inner surface of the cover along the first side of the cover and adjacent the first end of the cover;
- mounting a second guide hoop to the inner surface of the cover along the second side of the cover adjacent the first end of the cover;
- mounting a third guide hoop to the inner surface of the cover between the first guide hoop and the second end of the cover;
- aligning the third guide hoop with the first guide hoop;
- mounting a fourth guide hoop to the inner surface of the cover between the second guide hoop and the second end of the cover;
- aligning the fourth guide hoop with the second guide hoop;
- securing a first ship between the first guide hoop and the third guide hoop;
- securing a second strip between the second guide hoop and the fourth guide hoop; and
- mounting a clip to the outer surface of the cover.

* * * * *